United States Patent [19]
Clifford et al.

[11] Patent Number: 5,790,857
[45] Date of Patent: Aug. 4, 1998

[54] METHOD FOR ASSOCIATING AND STORING ARBITRARY DATA WITH GRAPHICAL USER INTERFACE ELEMENTS

[75] Inventors: Daniel K. Clifford, Palo Alto; Robert G. Johnston, Jr., Cupertino, both of Calif.

[73] Assignee: Apple Computer, Cupertino, Calif.

[21] Appl. No.: 895,531

[22] Filed: Jul. 17, 1997

Related U.S. Application Data

[63] Continuation of Ser. No. 243,463, May 16, 1994, abandoned.

[51] Int. Cl.$^6$ .................................................... G06F 9/45
[52] U.S. Cl. ............................................................. 395/703
[58] Field of Search .................................. 395/701, 703, 395/705

[56] References Cited

PUBLICATIONS

Stefano Maruzzi, "OS/2 2.1 Workplace Shell Programming", Random House (1994), pp. 448–456.
Thomas E. Burge & Joseph Celi, Jr., "Advanced OS/2™ Presentation Manager Programming", John Wiley & Sons, Inc. (1993), pp. 91–103.

"Inside Macintosh: Overview", Apple Computer, Inc., (1992).
"Inside Macintosh: Macintosh Toolbox Essentials", Apple Computer, Inc. (Oct., 1992).

Primary Examiner—James P. Trammell
Assistant Examiner—Peter J. Corcolan, II
Attorney, Agent, or Firm—Fliesler Dubb Meyer & Lovejoy

[57] ABSTRACT

Data structure and methods associating an arbitrary list of properties with user interface items on a graphical user interface display. Each property has a tag with which an application program can reference it, and arbitrary data which can be written, read and modified by the application program. Property lists for each user interface item are stored in in-memory pools of property lists. Each pool includes a header region having a variable number of index slots, each slot which is currently being used pointing to a respective property list in a property list region of the pool. Unused slots are maintained on a linked list of index slots. When a property list is to be added or removed from a pool, the maintenance routines grow or shrink the pool only by fixed increments. Each property list includes a variable number of property entries each having a tag field and a data field. Property lists are represented as a property table containing all of the tags in sorted order, followed by a property data region containing the data for all of the properties. Each property table entry includes a tag and an offset to the corresponding data in the property data region.

9 Claims, 19 Drawing Sheets

```
TYPE MenuID =                        {menu record}
    RECORD
        menuID:         Integer;     {number that identifies the menu}
        menuWidth:      Integer;     {width (in pixels) of the menu}
        menuHeight:     Integer;     {height (in pixels) of the menu}
        menuProc:       Handle;      {menu definition procedure}
        enableFlags:    LongInt;     {indicates whether menu and }
                                     {menu items are enabled}
        menuData:       Str255;      {title of menu}
        {itemDefinitions}            {variable-length data that }
                                     {defines the menu items}
    END;
```

FIG. 2
*(PRIOR ART)*

```
itemData: ARRAY[1..X] OF
    itemString:     String;    {text of menu item}
    itemIcon:       Byte;      {icon number minus 256} itemCmd:        Char;      {keyboard ezuivalent or }
                               { value ($1B) indicating }
                               { item has a submenu, or }
                               { ($1C) if item has }
                               { a script code, or }
                               { ($1D) if item's 'ICON' }
                               { should be reduced, or }
                               { ($1E) if item has an }
                               { 'SICN' icon}
    itemMark:       Char;      {marking character or }
                               { menu ID of submenu}
    itemStyle:      Style;     {style of menu text}
    endMarker:      Byte;      {contains 0 if no }
                               { more menu items}
```

FIG. 3
*(PRIOR ART)*

```
TYPE ControlRecord =
PACKED RECORD
    nextControl:    ControlHandle;  {next control}
    contrlOwner:    WindowPtr;      {control's window}
    contrlRect:     Rect;           {rectangle}
    contrlVis:      Byte;           {255 if visible}
    contrlHilite:   Byte;           {highlight state}
    contrlValue:    Integer;        {control's current setting}
    contrlMin:      Integer;        {control's minimum setting}
    contrlMax:      Integer;        {control's maximun setting}
    contrlDefProc:  Handle;         {control definition function}
    contrlData:     Handle;         {data used by contrlDefProc}
    contrlAction:   ProcPtr;        {action procedure}
    contrlRfCon:    LongInt;        {control's reference value}
    contrlTitle:    Str255;         {control's title}
END;
```

FIG. 4
*(PRIOR ART)*

```
TYPE AuxCtlRec =
RECORD
    acNext:     AuxCtlHandle;   {handle to next AuxCtlRec}
    acOwner:    ControlHandle;  {handle to this record's control}
    acCTable:   CCTabHandle;    {handle to control color table
                                  record}
    acFlags:    Integer;        {reserved}
    acReserved: LongInt;        {reserved for future use}
    acRefCon:   LongInt;        {for use by application}
END;
```

FIG. 5
*(PRIOR ART)*

```
TYPE EventRecord =

RECORD
        what:       Integer;    {event code}
        message:    LongInt;    {event message}
        when:       LongInt;    {ticks since startup}
        where:      Point;      {mouse location}
        modifiers:  Integer;    {modifier flags}
    END;
```

FIG. 7

```
CONST
    nullEvent       = 0;    {no other pending events}
    mouseDown       = 1;    {mouse button pressed}
    mouseUp         = 2;    {mouse button released}
    keyDown         = 3;    {key pressed}
    keyUp           = 4;    {key released}
    autoKey         = 5;    {key held down}
    updateEvt       = 6;    {a window needs updating}
    diskEvt         = 7;    {disk inserted}
    activateEvt     = 8;    {activate/deactivate window}
    osEvt           = 15;   {operating-system event}
    kHighLevelEvent = 23;   {high-level event}
```

FIG. 8

```
PROCEDURE MyEventLoop;
VAR
   cursorRgn:   RgnHandle;
   gotEvent:    Boolean;
   event:       EventRecord;

BEGIN
   cursorRgn := NewRgn;  {pass an empty region the first time thru}
   REPEAT
     gotEvent := WaitNextEvent(everyEvent, event, MyGetSleep, cursorRgn);
     IF (event.what <> kHighLevelEvent) AND (NOT gInBackground)
         THEN MyAdjustCursor(event.where, cursorRgn);
     IF gotEvent THEN    {the event isn't a null event, }
         Do Event(event) {so handle it}
     ELSE                {no event (other than null) to handle }
         DoIdle(event);  {right now, so do idle processing}
   UNTIL gDone;          {loop until user quits}
END;
```

FIG. 9

```
PROCEDURE DoEvent (event: EventRecord);
VAR
    window:     WindowPtr;
    activate:   Boolean;
BEGIN
    CASE event.what OF
      mouseDown:
        DoMouseDown(event);
      mouseUp:
        DoMouseUp(event);
      keyDown, autoKey:
        DoKeyDown(event);
      activateEvt:
        BEGIN
            window := WindowPtr(event.message);
            activate := BAnd(event.modifiers, activeFlag) <> 0;
            DoActivate(window, activate, event);
        END;
      updateEvt:
        DoUpdate(WindowPtr(event.message));
      diskEvt:
        DoDiskEvent(event);
      osEvt:
        DoOSEvent(event);
      kHighLevelEvent:
        DoHighLevelEvent(event);
    END; {of case}
END;
```

*FIG. 10*

```
PROCEDURE DoMouseDown (event: EventRecord);
VAR
   PART:         Integer;
   thisWindow:   WindowPtr:
BEGIN
   {map location of the cursor (at the time of mouse-down event) }
   { to general areas of the screen}
   part := FindWindow(event.where, thisWindow);
   CASE part OF {take action based on the mouse location}
   inMenuBar: {mouse down in menu bar, respond appropriately}
      BEGIN
         {first adjust marks and enabled state of menu items}
         MyAdjustMenus;
         {let user choose a menu command}
         DoMenuCommand(MenuSelect(event.where));
      END;
    inSysWindow: {cursor in a window belonging to a desk accessory}
      SystemClick(event, thisWindow);

inContent: {mouse down occurred in the content are of }
             { one of your application's windows}
     IF this Window <> FrontWindow THEN
     BEGIN {mouse down occurred in a window other than the front }
           { window—make the window clicked in the front window, }
           { unless the front window is movable modal}
        IF MyIsMovableModal(FrontWindow) THEN
           SysBeep(30)
        ELSE
           SelectWindow(thisWindow);
     END
     ELSE  {mouse down was in the content area of front window}
        DoContentClick(thisWindow, event);
                  (TO FIG. 11B)
```

FIG. 11A

*(FROM FIG. 11A)*

```
inDrag:              {handle mouse down in drag area}
   IF (thisWindow <> FrontWindow) AND
      (MyIsMovableModal(FrontWindow))
   THEN
      SysBeep(30)
   ELSE
      DragWindow(thisWindow, event.where, GetGrayRgn~~.rgnBBox);

inGrow:              {handle mouse down in grow region}
   DoGrowWindow(thisWindow, event);
inGoAway:            {handle mouse down in go-away region}
   IF TrackGoAway(thisWindow, event.where) THEN
      DoCloseCmd;
inZoomIn, inZoomOut: {handle mouse down in zoom box region}
   IF TrackBox(thisWindow, event.where, part) THEN
      DoZoomWindow(thisWindow, part);
   END; {end of CASE}
END; {of DoMouseDown}
```

FIG. 11B

```
PROCEDURE DoContentClick (window: WindowPtr; event: EventRecord);
VAR
    mouse:        Point:
    control:      ControlHandle;
    part:         Integer;
    windowType:   Integer;
BEGIN
    windowType := MyGetWindowType(window);   {get window type}

CASE windowType OF kPlaySoundsModelessDialogBox:
        BEGIN
            SetPort(window);
            mouse := event.where;    {get the mouse location}
            GlobalToLocal(mouse);    {convert to local coordinates}
            part := FindControl(mouse, window, control);
            IF control = gSpeedPopUpControlHandle THEN
                {mouse-down in Modem Speed pop-up menu}
                DoPopUpMenu(mouse, control);
            CASE part OF
                inButton:    {mouse-down in Play button}
                    DoPlayButton(mouse, control);
                inCheckBox:  {mouse-down in checkbox}
                    DoDrumRollCheckBox(mouse, control);
                OTHERWISE
                    ;
            END;  {of CASE for control part codes}
        END;  {of kPlaySoundsModelessDialogBox case}
        {handle other window types, such as document windows, here}
    END;  {of CASE for window types}
END;  {of DoContentClick}
```

*FIG. 12*

```
struct PropertyPoolStorageHeader {
    UInt32    fPoolSeed;
    UInt32    fPoolStorageAllocatedSize;
    UInt32    fPoolStorageUsedSize;
    UInt16    fPoolIndexAllocatedSize;
    UInt16    fPoolIndexFirstFree;
    UInt32    fPoolListIndex[kDefaultIndexSize];
};
```

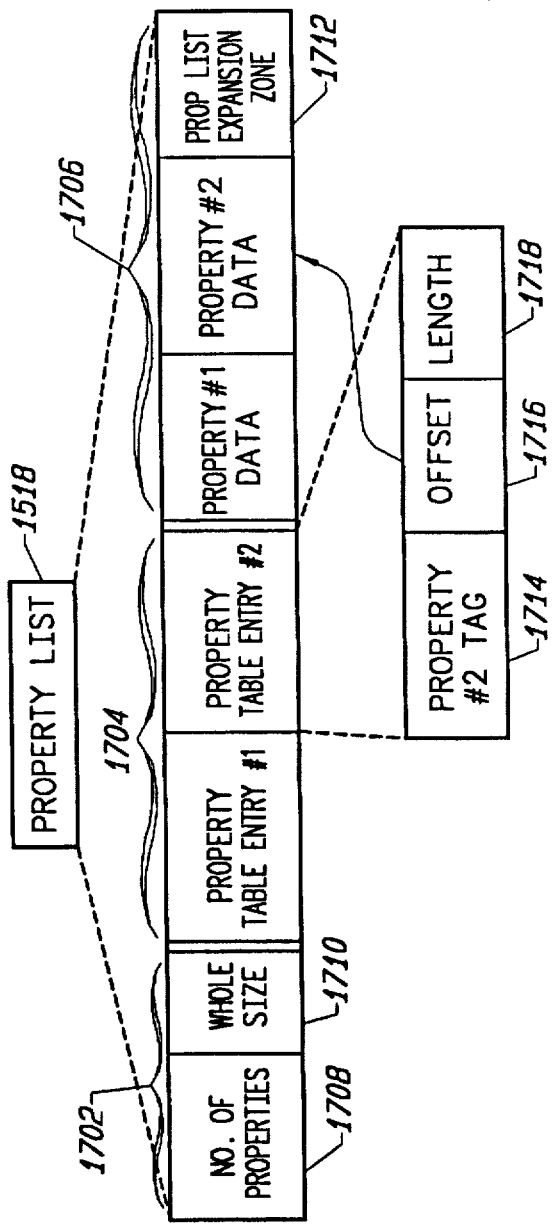

FIG. 21 SETTING A PROPERTY VALUE *v* WITH TAG *tag* IN A LIST *l*

METHOD FOR ASSOCIATING AND STORING ARBITRARY DATA WITH GRAPHICAL USER INTERFACE ELEMENTS

This application is a continuation of Ser. No. 08,243,463, filed May 16, 1994, now abandoned.

BACKGROUND

Graphical user interfaces on computer systems are gaining widespread use. Typical systems include the Macintosh® graphical user interface environment in Macintosh computers provided by Apple Computer, Inc., Cupertino, Calif.; the Windows® environment provided by Microsoft Corporation, Redmond, Wash.; and the New Wave® environment provided by Hewlett-Packard Corporation, Palo Alto, Calif. In such systems, a work space on the display system is set up with a desktop metaphor. Within the desktop, there are a number of user interface items displayed, including for example, windows, menus, controls, lists and so on. A window is an area on the screen that displays information, including user documents as well as communications such as alert boxes and dialog boxes. The user of the computer can open or close a window, move it around on the desktop, in some cases change its size, scroll through it and edit its contents. A menu is a user interface item that allows the user to view or choose an item from a list of choices and commands supported by an underlying application program or system software. Menus are typically "opened" (i.e. made to appear on the display) by selecting an item corresponding to the title of the menu on a menu bar user interface item. The choices in a menu are themselves considered user interface items, and are referred to herein as menu items. A dialog box is a window that an application program displays to solicit information from the user before the application carries out the user's command.

Control items can include for example buttons, check boxes, radio buttons, pop-up menus, scroll bars, as well as other control items which an application program can define (such as sliders and dials). In the Macintosh graphical user interface environment, buttons appear on the display as rounded rectangles with a title centered inside. Check boxes appear as a small square, either checked or not, with a title alongside. Check boxes act like toggle switches, turning a setting either on or off. Radio buttons appear as small circles, with the text alongside. They are provided in groups to offer a choice among several alternatives, typically inside a dialog box. Only one radio button in a radio button group can be active at a time. A pop-up menu appears as a window listing several choices which, like radio buttons, are mutually exclusive.

Scroll bars are control items which appear as a light gray rectangle with scroll arrows at each end. Inside the scroll bar is a square referred to as a scroll box. The remainder of the scroll bar is referred to as the gray area. A window can have a horizontal scroll bar, a vertical scroll bar, or both. A vertical scroll bar lies along the right side of the window, and a horizontal scroll bar runs along the bottom of the window. In a vertical scroll bar, the position of the scroll box in the gray area indicates which relative vertical portion of underlying content appears in the window, whereas the position of the scroll box in the gray area in a horizontal scroll bar indicates the position of the depicted information horizontally relative to the entire horizontal width of the underlying content.

FIG. 1 illustrates a display produced in the Macintosh environment. It illustrates a desktop 102 which contains, horizontally across the top, a menu bar 104 having six menu "titles" 106 appearing thereon. Also on the desktop are three Finder™ items, icons 108, 110 and 112. Also appearing on the desktop is a window 114 without scroll bars. The window 114 includes a title bar 116 and a close box 118 on which the user can click to close the window. The window 114 also includes a content region 120, the appearance and behavior of which is defined by an application program which owns the window 114. Several application-defined user interface items 122 currently appear in the document region 120.

The window 114 is referred to as the "active" window since it is the one currently designated to receive notice of certain kinds of events, described below. It is also the foreground window. In the background, two other windows 124 and 126 appear. A button control item 128 appears in the window 124, as does an application defined slider control item 128.

Computer systems supporting a graphical user interface environment are typically equipped with a pointing device such as a mouse and a pushbutton. When the user desires to select a user interface item, the user first uses the mouse to position the cursor to a point on the screen at which the user interface item appears, and then clicks the pushbutton. For certain types of actions, a double click is required.

Such systems also typically include, in system software located in either read-only memory (ROM) in the computer system or on another storage medium, a collection of software routines which are callable by application programs. The collection of system software routines is logically divided into functional groups, known as managers, that handle specific tasks or user interface items. For example, the Macintosh computer includes, mostly in ROM, a "toolbox" containing, among other things, the managers set forth in Table I.

TABLE I

| Manager | Description |
| --- | --- |
| Window Manager | Creates and manages windows of various types. |
| Dialog Manager | Creates and manages dialog boxes, which are special kinds of windows. |
| Control Manager | Creates and manages controls. |
| Menu Manager | Creates and manages an application's menu bar and the menus it contains. Also handles the drawing of menus and user actions within a menu. |
| Event Manager | Reports events to application programs, describing user actions and changes in the processing status of the application program. |
| List Manager | Manages and creates lists of items on the display. |

The availability of a common set of routines that application programs can call to implement the user interface, not only ensures familiarity and consistency for the user, but also helps to reduce the application program's code size and development time. Use of the toolbox routines also maximizes the probability that an application program will be compatible with present and future versions of the system software. An application program can bypass the toolbox routines, or can use the routines to define its own types of windows, menus and controls, but only at the expense of some or all of the above advantages.

However, use of the provided common system routines also limits the flexibility of an application developer to some degree. For example, when the application developer wishes to add a menu to the menu bar, it can call the menu manager NewMenu function with a specified NewMenu identifier (ID) and title. The NewMenu function creates a menu record for the NewMenu and returns a handle to the menu record. The menu record contains only a set of predefined fields as defined in the Pascal language MenuInfo type definition shown in FIG. 2. (All computer language listings set forth herein are Pascal language listings unless otherwise mentioned.) The menuID, menuWidth, menuHeight, enableFlags, and menuData fields of the MenuInfo record are self-explanatory. The menuProc field contains a handle to a menu definition procedure for the menu, which the menu manager uses to, among other things, draw the menu. Typically, the menu manager's own default procedure is referenced here. The field labeled {itemDefinitions} is a variable length array of fixed-size entries that define the characteristics of each menu item in the menu. Conceptually, the {itemDefinitions} array can be thought of as having the structure shown in FIG. 3.

After creation of a menu record using the menu manager NewMenu function, the application program can insert it into the current in-memory menu list by specifying the NewMenu handle to the menu manager InsertMenu procedure. The application program can add menu items to a menu using the menu manager InsertMenuItem procedure and specifying the menu handle and the data which is to fill the predefined fields for the menu item in the menu record of FIGS. 2 and 3.

When the user selects a menu item, the application program typically receives the menu ID of the menu selected by the user, and the item number of the menu item chosen by the user. The application program can convert the menu ID to a menu handle using the menu manager GetMenuHandle function, and can then use the menu handle and menu item number to invoke a variety of different menu manager routines which return various information about the selected item from the menu record.

However, the menu manager's use of a menu record having only predefined fields limits the flexibility of the application program. For example, an application developer may wish to add a speakable text field to some or all menu items in some or all menus so that the application program can speak a selected operation before performing it. Alternatively, the developer may wish to have data stored with the menu item which a menu item drawing routine would use to draw the menu item on the display. In order to support either feature in conventional systems, the developer would typically need to maintain a separate parallel database, relating menu items with the speakable text or the drawing data. The manufacturer of the operating system may also wish to add fields to user interface item records in a future release of the operating system, but this currently requires recompilation of existing application programs for the new release.

Application developers writing for some GUI systems, such as NeXT Step, can address this problem through the use of object-oriented languages such as C++. Such languages allow developers to sub-class the in-memory records for user interface item record types to associate additional custom data with the user interface items. Such an arrangement does not solve the problem completely, however, since it is merely compile time mechanism. The arrangement does not permit changes of the record type definition during run time. This is a problem for some kinds of added fields which an application developer or operating system vendor might desire. For example, since speakable text information is often lengthy, an application developer might prefer to allocate memory space for such information only if the particular system on which the program is currently running supports speakable text as an operating system extension. This can be determined only at run time; it is not known at compilation time.

The problem is also partially resolved in some conventional types of user interface item in-memory records, such as the Macintosh record type for a control item. FIG. 4 illustrates the data type for a control item in-memory record, and it can be seen that a LongInt field labeled contrlRfCon is included for an application program to use for any purpose. Control manager routines GetControlReference and SetControlReference procedures are available to read and write information to this field. Additionally, each control user interface item in Macintosh computers also has associated with it an auxiliary control record of type AuxCtlRec illustrated in FIG. 5, which also includes a LongInt labeled acRefCon for use by the application program for any purpose. These application-definable fields can be written at run time, but they are far too short to hold most kinds of custom item-specific information which an application program developer might require. They could be used to hold pointers to in-memory objects which the application program can define at run time, but this is an awkward solution for the application developer and still does not solve the problem of future operating system releases mentioned above.

Accordingly, there is a need for improved techniques for storing run time information for use by system and application programs related to user interface items appearing on a computer display.

SUMMARY OF THE INVENTION

Roughly described, the invention includes a data structure for in-memory storage of information related to user interface items appearing on a computer display. The invention can also be viewed as a method or set of methods for maintaining and/or implementing such a data structure, or as a combination of the data structure and such methods.

The data structure and methods associate an arbitrary list of properties with each user interface item. Each property has a tag with which an application program can reference it, and arbitrary data which can be written, read and modified by the application program.

In the embodiment described herein, the property lists (which can also be used for non-user-interface purposes) are stored in pools of property lists. Each pool includes a header region having a variable number of index slots, each slot which is currently being used pointing to a respective property list in a property list region of the pool. Unused slots are maintained on a linked list of index slots. When a property list is to be added or removed from a pool, the maintenance routines grow or shrink the pool only by fixed increments; thus a pool expansion zone at the end of the last property list is often available to receive newly added property lists without having to resize memory.

Each property list includes a variable number of property entries each having a tag field and a data field. In the embodiment described herein, property lists are represented as a property table containing all of the tags in sorted order, followed by a property data region containing the data for all of the properties. Each property table entry includes a tag and an offset to the corresponding data in the property data region. A property list expansion zone is maintained at the end of the property data region to accommodate new properties added to the property list, and expansions of data of properties already existing in the property list.

BRIEF DESCRIPTION OF THE DRAWINGS

The invention will be described with respect to particular embodiments thereof, and reference will be made to the drawings, in which:

FIG. 2 is a Pascal language code listing illustrating a prior art in-memory data structure for a menu item;

FIG. 3 is a Pascal language code listing illustrating the structure of the {itemDefinitions} field of FIG. 2;

FIGS. 4 and 5 are Pascal language code listings illustrating prior-art in-memory data structures for a control item;

FIG. 7 is a Pascal language code listing illustrating the structure of an event record;

FIG. 8 is a Pascal language code listing defining codes for the "what" field of the event record of FIG. 7;

FIG. 9 is a Pascal language code listing illustrating an event loop for an application program according to the invention;

FIG. 10 is a Pascal language code listing of the DoEvent procedure of FIG. 9;

FIGS. 11A-B is a Pascal language code listing of the DoMouseDown procedure of FIG. 10;

FIG. 12 is a Pascal language code listing of the DoContentClick procedure of FIG. 11;

FIG. 17 is a diagram illustrating an in-memory structure for a property list according to the invention;

FIG. 18 is a C-language code listing for the structure of FIG. 17; and

DETAILED DESCRIPTION

I. SYSTEM OVERVIEW

Figure 6:
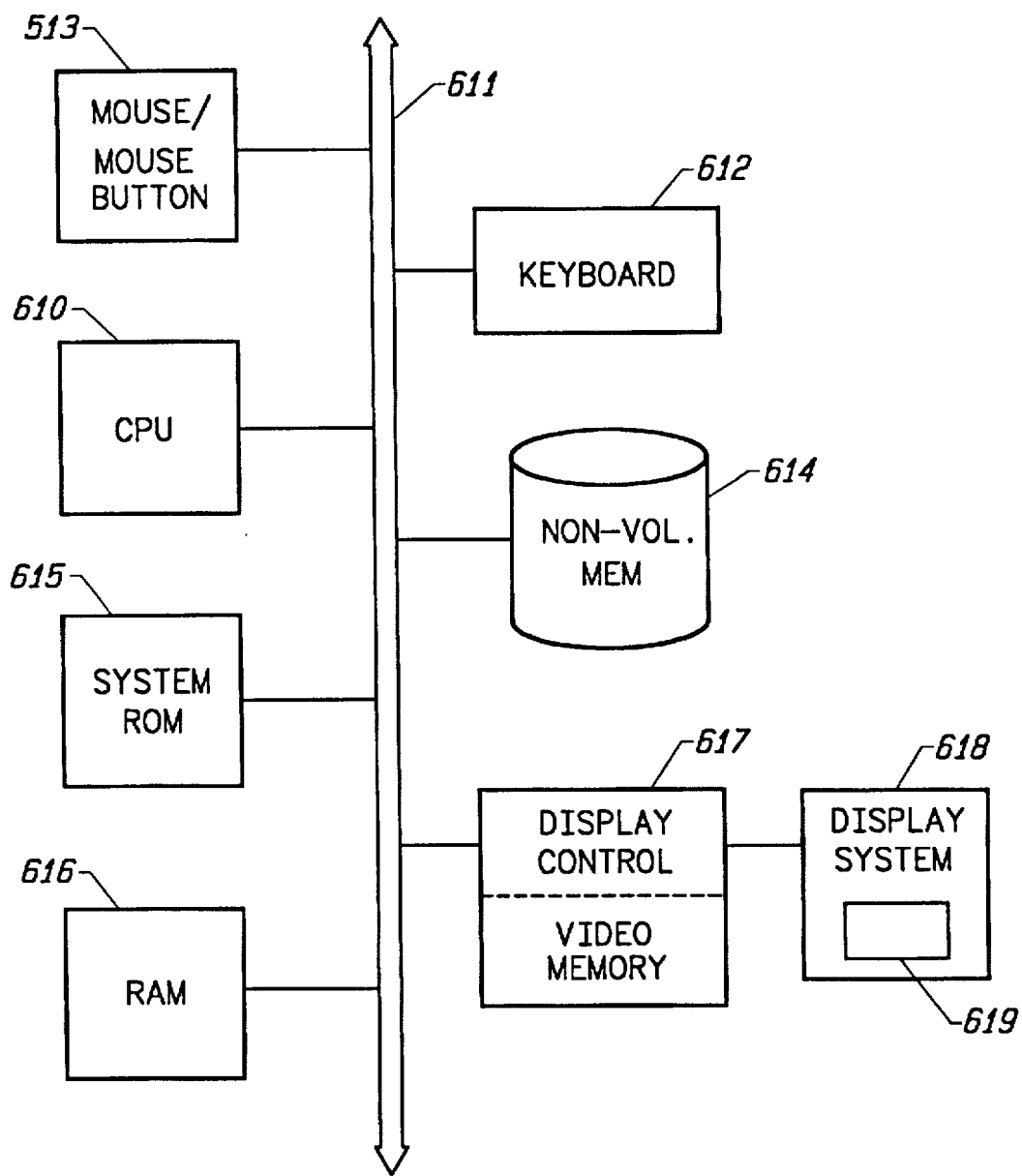
FIG. 6 is a block diagram of a computer system according to the invention.

The invention can operate on a wide variety of hardware platforms. FIG. 6 illustrates a Macintosh computer system implementing the features of the invention. It includes a host CPU 610 coupled to a system bus 611. The system includes a keyboard 612, a mouse 613 including a mouse button, or other pointing device, and a non-volatile memory 614, such as a hard disk, floppy disk, non-volatile integrated circuitry memory system, or the like. Similarly, system ROM 615 and RAM (random access memory) 616 are coupled to the bus 611. The system ROM 615 stores most of the operating system for the computer of FIG. 6, including most of the Macintosh toolkit, although operating system extensions and replacement routines can in some instances be obtained from non-volatile memory 614 and placed in RAM 616. The RAM 616 is also used to maintain various tables needed by the software in the ROM 615, including run time data structures carrying information related to respective user interface items appearing on the display. Application software is also included in RAM 616.

The computer system of FIG. 6 can support different memory management schemes such as caching and virtual memory in which some in-memory data may not actually be located in the RAM 616 itself at various times. These mechanisms are transparent to the invention. Thus, data is referred to herein as being located "in" RAM 616 even if it is actually, at various times, located elsewhere due to memory management schemes.

The system of FIG. 6 also includes a display controller 617 which includes video memory. The display controller 617 drives a display 618 such as a CRT video monitor, LCD flat-panel display, or the like. The display system 618 has a display screen 619, such as that shown in FIG. 1.

II. GENERAL SOFTWARE HANDLING OF USER INTERFACE EVENTS

Figure 1:
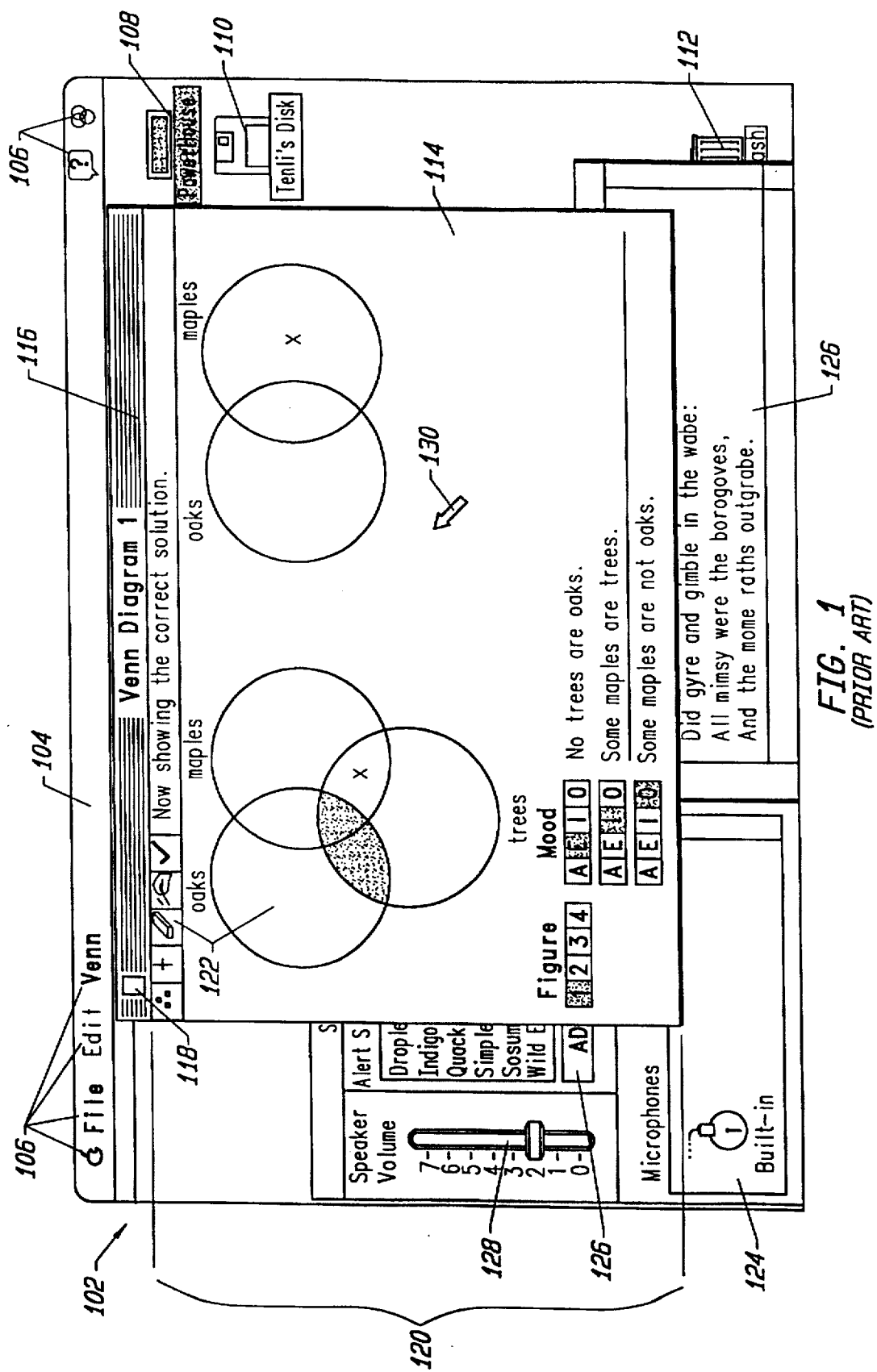
FIG. 1 illustrates a display produced in a Macintosh graphical user interface environment.

Referring to FIG. 1, the desktop 102 displays a cursor 130 which a user may move by moving the mouse 613 in a corresponding motion. When the cursor is positioned over one of the user interface items on the display, the software program which owns that item can automatically change the item to reverse video, for example. The user can click on that item using the mouse button, and can drag it to a different position either in the same window or in a different window. The user can also double click on a user interface item. In fact, the user can perform a wide variety of different activities with respect to a user interface item, and it is up to the software program which owns the item to take whatever action is appropriate, if any, in response to the event. Also, user-initiated actions which are passed to a given application program are referred to herein as user interface events. Mouse-based user interface events occur "with respect to" particular user interface items, in the sense that the cursor is positioned over a particular user interface item when the event occurs.

Events are communicated to an application program by an event manager in the Macintosh toolbox. Typically, the application program runs an event loop which repeatedly calls an event manager routine which returns any new events that have occurred since the last call. If the event manager routine returns nil, then no new event has occurred. Alternatively, the application program can call an event manager routine which does not return until an event directed to the application has occurred. The event manager is described in the following references, both incorporated by reference in their entirety: Apple Computer, Inc., "Inside Macintosh: Overview" (1992); and Apple Computer, Inc., "Inside Macintosh: Macintosh Toolbox Essentials" (1992). Note that the event manager can report a variety of different kinds of events to an application program other than user interface events. These other events are not important for an understanding of the invention and are not described herein.

The event manager maintains an event stream containing those events that are available to a given application. When an event is reported to an application program, it is reported in the form of an event record having the type definition set forth in FIG. 7. The event code in the "What" field of the event record specifies the kind of event that occurred, according to the codes shown in FIG. 8. Note that the application program can specify to the event manager which types of events are to be reported to the application program. This is accomplished by specifying an event mask as a parameter to various event manager routines.

FIG. 9 is a typical simple event loop for an application program. The procedure repeatedly uses the event manager WaitNextEvent to retrieve events. This function returns a Boolean value of false if there are no events of the specified types (other than null events) pending for the application, and returns true if it has retrieved any event other than a null event.

After WaitNextEvent returns, the procedure calls an application-defined routine, MyAdjustCursor to adjust the cursor as necessary, assuming the event is not a high-level event and the application's window is not in the background. If WaitNextEvent retrieved any event other than a null event, the loop calls DoEvent, an application-defined procedure, to process the event. Otherwise, the procedure calls another application-defined idling procedure, DoIdle.

A simple DoEvent procedure is set forth in FIG. 10. This procedure examines the value of the "What" field of the event record to determine the type of event received and then calls an appropriate application-defined routine to further process the event. Note that the event manager does not report an event if the user simply moves the mouse. However, the application program can request that the event manager report mouse-moved events if the user moves the cursor out of the region on the display that the application program specifies to the WaitNextEvent function. Thus such an application-defined region can be thought of as a user interface item. The system toolbox also provides a number of routines as part of the individual managers, which the application program can call in response to a button-down event to track movement of the mouse while the user holds the mouse button down.

When the application program receives a mouse-down event, it typically uses the window manager function Find-Window to determine the location of the cursor at the time the mouse button was pressed. The FindWindow function takes the "Where" field of the event record provided by the event manager, and returns a pointer to the window in which the event occurred, and an indication of the part of the window in which the event occurred. A sample DoMouse-Down procedure for an application program is set forth in FIG. 11.

As can be seen, if the FindWindow routine returns the inMenuBar constant, the mouse location is in the menu bar. In this case, the application program first adjusts its menus using an application-defined MyAdjustMenus procedure, and then calls the menu manager function MenuSelect, passing it the location of the mouse, to allow the user to choose a menu command. The MenuSelect function displays menus and handles all user interaction, tracking the location of the cursor as the user moves it through the menu items, until the user releases the mouse button. The function then returns the menu ID of the menu containing the chosen command, and the menu item number of the chosen command.

As can be seen further in FIG. 11, the DoMouseDown procedure passes the selected command information to an application defined DoMenuCommand procedure. Such procedure takes the action appropriate to the command, and can use a number of menu manager routines to do so. Among these routines are routines to retrieve and change the contents of various fields of the in-memory menu item record as described above, as well as other routines to add, delete or change the value of application-defined properties associated with the menu item as hereinafter described.

Referring again to FIG. 11, if the FindWindow function returned the inContent constant, then the DoMouseDown procedure calls an application-defined DoContentClick procedure. FIG. 12 illustrates a simple DoContentClick procedure. As set forth therein, the procedure first determines which of the application's windows the cursor was located in when the MouseDown event occurred; the procedure of FIG. 12 considers only one application-defined window type, identified as kPlaySoundsModelessDialogBox. It then converts the Mousedown location to local coordinates, i.e. relative to the window, and calls the control manager Find-Control procedure with the mouse location and the window identifier to determine whether the MouseDown occurred in a control. FindControl returns nil if the MouseDown did not occur in a control item, and if it did occur in a control item, it returns the handle to the control and a part code indicating a part of the control in which the MouseDown event occurred (for controls that have more than one part). The DoContentClick procedure of FIG. 12 then performs the appropriate action depending on the control and control part selected by the user. The application-defined routines which perform the actions can utilize, among other things, the procedures described above for reading and writing data to the conventional in-memory control record, as well as toolbox-provided procedures to add and delete application-defined properties associated with the control item, or modify the values of such properties.

Returning again to FIG. 11, the DoMouseDown procedure also performs other actions if the MouseDown occurred on other user interface items, but the description provided herein with respect to menu items and control items will be sufficient for an understanding of the invention.

As can be seen, the computer system of FIG. 6 can have a number of different application programs running concurrently in a time-multiplexed fashion. It also has a toolbox located mostly in system ROM 615, which contains a number of different managers, each containing procedures callable by an application program, to perform specific functions related to respective kinds of user interface items. The system ROM 615 also contains other managers callable by the application programs and/or by system software, which perform functions not related to specific user interface items. The application programs are typically loaded into RAM 616 before executed, at least in part, and both the application programs and the toolbox managers maintain data in the RAM 616. Still further, although in some embodiments of the invention, managers for different types of user interface items can be entirely substituted for the corresponding conventional managers. However, for compatibility reasons, it is desirable to continue to support the procedures which older application programs call from the conventional managers. Thus in the present embodiment, system ROM 615 also contains the conventional managers for each type of user interface item.

III. SOFTWARE COMPONENTS AND IN-MEMORY DATA STRUCTURES

Figure 13:
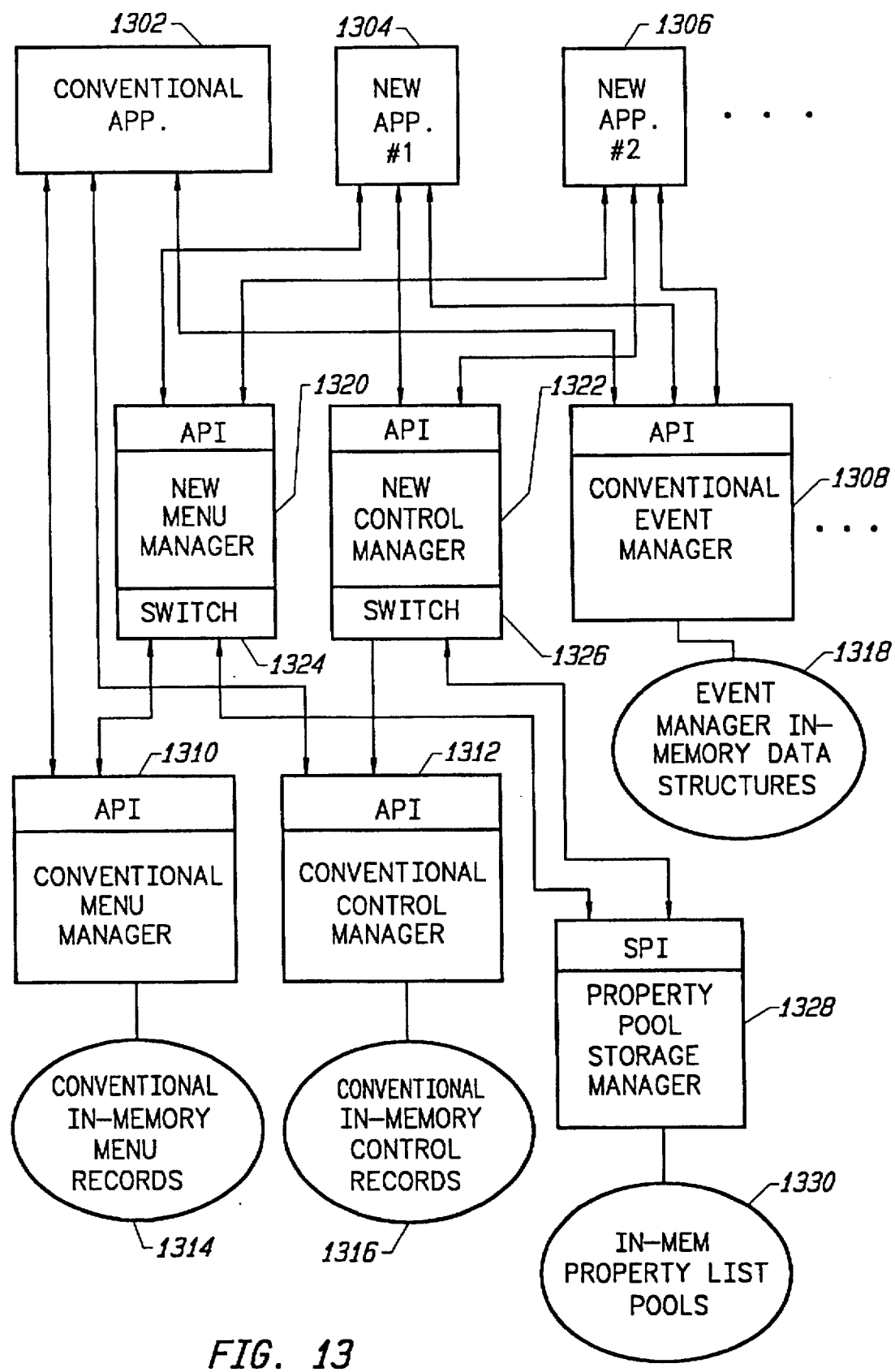
FIG. 13 is a conceptual block diagram of software components of a system according to the invention.

FIG. 13 is a conceptual block diagram showing how different software components of the system interact with each other. Shown in FIG. 13 are a conventional application program 1302, and two new application programs 1304 and 1306 which take advantage of the new managers. The conventional application 1302 communicates with the conventional event manager 1308 using the API (application programmer's interface) of the conventional event manager 1308, and continues to communicate with a conventional menu manager 1310 using its API, and with a conventional control manager 1312 using its API. The conventional application 1302 also communicates with other managers (not shown) in the toolbox. The conventional menu manager 1310 continues to support all of the menu manager procedures described in the above-incorporated "Inside Macintosh" volumes, as does the conventional control manager 1312 and event manager 1308. The conventional menu manager 1310 maintains the conventional in-memory menu records 1314 as previously described and as set forth in the above-incorporated volumes; all fields previously associated with menu items continue in the present embodiment to be stored here. Similarly, the conventional control manager 1312 continues to store at 1316 all the fields which have in the past been predefined for in-memory control records. For completeness, FIG. 13 also shows storage 1318 for data structures maintained by event manager 1308. Thus the conventional application 1302 continues to operate in the new environment without having to be recompiled or changed in any way.

New application programs 1304 and 1306 can also continue to use the conventional managers 1310 and 1312, but preferably use the APIs for a new menu manager 1320 and a new control manager 1322. The new application programs 1304 and 1306 continue to use the conventional event manager 1308. As described in more detail below, the API for the new menu manager 1320 contains a number of different routines for different operations to be performed on an application-specified "property" associated with an application-specified menu item, and includes a switch 1324 to determine whether or not the specified property is one of the fields predefined in the conventional system. If it is, then the new menu manager 1320 translates the call into one appropriate for the conventional manager 1310 API and passes the call thereto. If it is not, then the switch 1324 translates the call into one appropriate for the SPI (system programmer's interface) of a new property pool storage manager 1328, described in more detail below. Similarly, the API of the new control manager 1322 contains a number of different procedures for different operations to be performed on an application-specified property associated with an application-specified control item, and includes a switch 1326 to determine whether or not the specified property is one of the fields predefined in the conventional system. If it is, then the new control manager 1322 translates the call into one appropriate for the conventional control manager 1312 API and passes the call thereto. If it is not, then the switch 1326 translates the call into one appropriate for the SPI of the property pool storage manager 1328.

The property pool storage manager 1328 maintains variable length lists of variable length properties in pools 1330 in RAM 616 (FIG. 6). It maintains properties as a collection of property list "pools", each of which contains one or more property "lists", each of which contains one or more property entries, each of which contains a tag field and a data field. The SPI of property pool storage manager 1328 contains a number of different procedures, each for performing a different kind of operation on either an entire specified pool, an entire specified list within a specified pool, or on a specified property within a specified list within a specified pool. Thus the translation from user interface item and property tag on the one hand, to property pool storage manager pool, list and tag identifications on the other hand, is performed by the new menu manager 1320 and the new control manager 1322 as appropriate. The latter managers therefore can define the size of the lists in the in-memory property list pools 1330.

Advantageously, each of the lists is easily relocateable in memory and can therefore be treated as a unitary block as hereinafter described, thereby permitting the property pool storage manager to efficiently move them around within a pool to best utilize available memory space. Also advantageously, each pool is easily relocateable in memory for the same reason. It has been found that the translations performed by the user interface item managers such as 1320 and 1322 can keep the property lists and property pools of manageable size (neither too small nor too large in most situations) and at the same time simplify the translations, by dividing up properties, lists and pools according to the appearance of the display. Moreover, different user interface item managers can be designed to view the appearance of items on the display with different granularity in order to optimize the size of the associated property lists and property pools.

For example, control items typically appear within dialog boxes, which are therefore in a sense "parent" user interface items for the control items they contain. Control items themselves are parent user interface items to "control parts" (such as the different parts of a scroll bar), which also can be considered to be user interface items. In some embodiments, a control manager could be designed which permits application programs to attach a separate list of properties to each control part, and maintains the property lists in pools corresponding to each control item (or in pools corresponding to each dialog box). It is believed, however, that such an association would result in property lists which do not optimize memory usage. Preferably, therefore, the control manager associates individual property lists with each control item and maintains the property lists in pools according to the control item's parent dialog box.

Similarly, menu items are part of menus on the display, which in turn are part of a menu bar. As with the control manager, a menu manager could be designed which associates property lists at any of the three levels of granularity at which menu-related user interface items appear on the display. It is believed most memory efficient, however, if the menu manager associates a separate property list with each menu item, and groups the property lists into pools according to the menu to which the menu item belongs.

Note that there is no reason why an embodiment could not, in addition to the above, also maintain property lists associated with higher level user interface items. That is, for example, the menu manager could maintain property lists associated with each menu, in addition to those associated with each menu item. The menu manager could group the menu-associated property lists according to the menu bars to which the menus belong.

Figure 14:
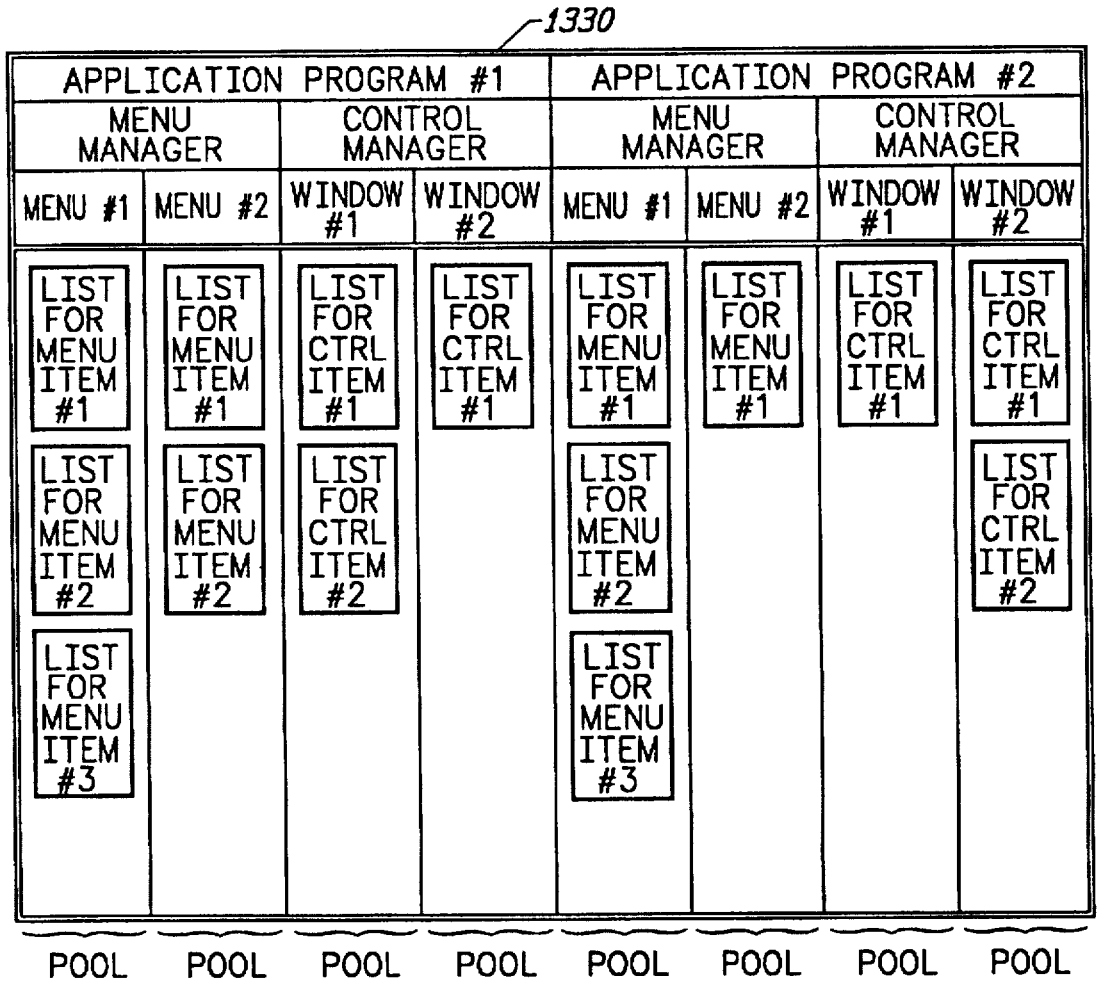
FIG. 14 is a conceptual diagram of a grouping of property pools and property lists according to the invention.

FIG. 14 summarizes conceptually the preferred relationship between application programs and user interface items on the one hand, and pools and property lists on the other hand. As illustrated therein, each menu item has a separate property list associated therewith, and the property lists are grouped into pools according to the menu owning the menu item and the application (or system) program owning the menu. Similarly, each control item has associated therewith a respective property list, and control item property lists are grouped into pools according to the window in which they are displayed, and the application (or system) program owning the window.

Figures 15, 16:
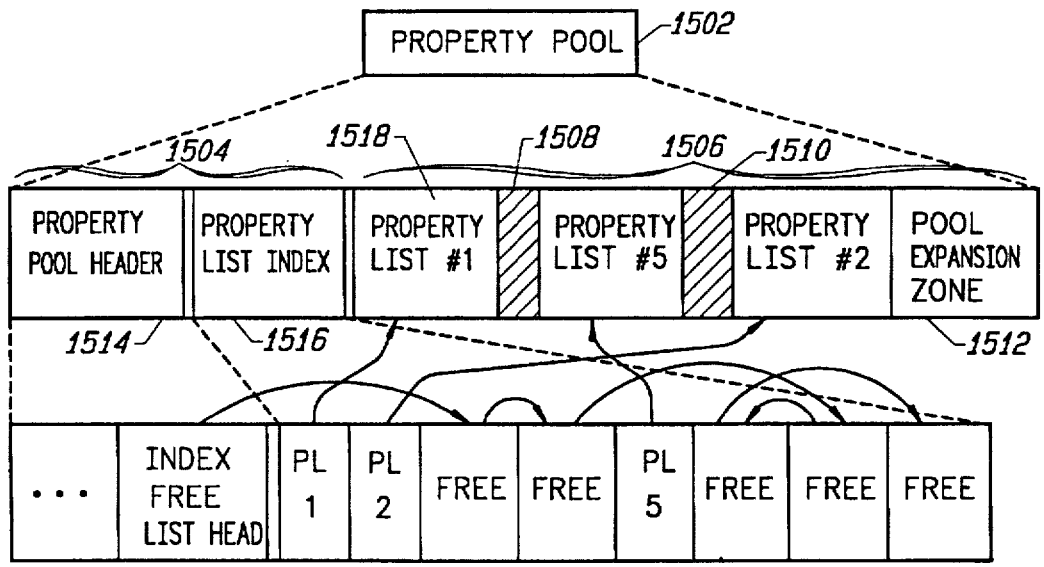
FIG. 15 is a diagram illustrating an in-memory structure for a property pool according to the invention.
FIG. 16 is a C-language code listing for the structure of FIG. 15.

FIG. 15 illustrates the actual structure in memory of a property pool. Referring to FIG. 15, the property pool 1502 contains a header region 1504 immediately followed by a property list region 1506. As used herein, fields of a data structure are generally considered to precede or follow each other in memory if they have respectively lower or higher memory addresses. It will be understood that different computer systems utilize different memory addressing conventions, however, and in a system for which memory addresses are decreasing rather than increasing, a preceding region has a higher memory address than a following portion of memory.

The header portion 1504 of the property pool 1502 exists in a contiguous region of memory, as does the property list region 1506. The property list region 1506 contains one or more property lists each having a unique property list ID. Each list is located contiguously in memory, but different lists can have different lengths and may not be entirely filled. Also, the different lists need not be disposed in the order of the list IDs, and they need not be adjacent to each other in the property list region 1506. For example, regions 1508 and 1510 are unused.

Region 1512 in the property list region 1506 is a pool expansion zone, available for adding new property lists without requiring the allocation of additional memory.

The header region 1504 of the property pool 1502 contains a property pool header 1514, immediately followed by a variable length property list index 1516. The property pool region 1504 is defined by the C-language struct set forth in FIG. 16, with the fPoolListIndex[] array representing the property list index 1516. The property pool header 1514 has a fixed length and includes a seed fPoolSeed, which holds the seed value for the property pool 1502. The seed value is incremented each time a property is changed in the pool. The header 1514 also includes an fPoolStorageAllocatedSize field which holds the size of the property pool including the pool expansion zone 1512, and an fPoolStorageUsedSize field containing the size of the property pool 1502 with the exception of the pool expansion zone 1512. Thus the difference between fPoolStorageAllocatedSize and fPoolStorageUsedSize represents the length of the pool expansion zone 1512.

The property pool header 1514 also contains an fPoolIndexAllocatedSize field which holds the number of property list index slots contained in the property list index 1516. Each such slot in the property list index 1516 corresponds to a sequentially respective property list ID number, with unused slots (i.e. slots for which the property list region 1506 contains no corresponding property list) being linked together in a linked list. The head of the linked list is pointed to by the fPoolIndexFirstFree field of the property pool header 1514. Additionally, in the property list index 1516, each index slot which does correspond to a property list in the property list region 1506, points to the beginning of the corresponding property list in the property list region 1506. Note that the property list ID numbers do not bear any necessary relationship with the menu item numbers or control item numbers of user interface items because of the level of translation which is performed by menu manager 1320 and control manager 1322 (FIG. 13) before list ID numbers are provided to the property pool storage manager 1328.

As described more fully hereinafter, in addition to including procedure calls to create and destroy entire property lists, the SPI of the property pool storage manager 1328 includes procedure calls to add, delete and modify properties in individual property lists in property list region 1506. The property lists can therefore shrink or grow in size. The property pool storage manager 1328 will use the unused regions 1508 and 1510, as well as the pool expansion zone 1512 as much as possible to accommodate lengthening property lists. The SPI of property pool storage manager 1328 also includes procedure calls to add or delete entire property lists. When adding a property list, the property pool storage manager 1328 places it in the pool expansion zone 1512 if possible. If the pool expansion zone 1512 is too small either to add a property list or to lengthen an existing property list, then the property list region 1506 is expanded to increase the size of the pool expansion zone 1512. Advantageously, whenever the property pool storage manager 1328 grows or shrinks the size of the property pool 1502, it does so only by a predefined incremental size referred to herein as kPropertyPoolStorageGrowthSize. Additionally, whenever the property pool storage manager 1328 creates a new property list in the property list region 1506, it assigns to the new property list the list ID number of the first free index slot in the linked list of free index slots in the property list index 1516. If no free slots are available, then the property pool storage manager 1318 grows the property list index 1516 by a predefined number of index slots referred to herein in as kPropertyPoolIndexGrowSize, adding the new slots to the free list.

When an application program or system service needs a new property list, what it actually receives is the new property list's list ID number. Although the actual property list may move around in the memory to accommodate changes in the property pool 1502, each list is always accessible from its list ID number because all of the offsets in the property list index are always updated when this occurs. In this way, an application program or system service can always have a valid reference to a property list even if the list itself moves.

FIG. 17 illustrates the structure of one of the property lists 1518 in FIG. 15, and FIG. 18 defines the structure using C-language structs. Referring to FIG. 17, a property list 1518 comprises in contiguous memory a property list header region 1702, followed by a property table 1704, followed by the property data 1706. The property list header region 1702 contains a field 1708 indicating the number of properties in the property list 1518, as well as a field 1710 indicating the whole size of the property list 1518 including a property list expansion zone 1712 described below. The property table region 1704 contains a property table entry for each of the properties in the property list, and the property data region 1706 contains all of the property data fields for all of the properties in the property list 1518. A property table entry has a fixed size and includes a four byte property tag in a field 1714, an offset in a field 1716 to the beginning of the corresponding property data in the property data region 1706, and a field 1718 indicating the length (or, equivalently, the ending position) of the corresponding property data in the property data region 1706. Note that the terms, "property" and "property list entry" are used herein to refer to the combination of a tag and its corresponding data, but as can be seen in FIG. 17, a particular property list entry is not stored contiguously in memory. Instead, the tags are all located in the property "table" 1704, and the data is all located in the property data region 1706.

Note that the property table entries in the property table 1704 are maintained in a sequence which is sorted by a property tag so that an individual tag can be found in O(log(n)) time by means of a binary search. Also note that in the preferred embodiment, the system software and application programs have separate universes from which they can choose tags. Specifically, all completely lower-case tags are reserved for system software. In this manner, future system software releases can attach new properties to user interface items without interfering with existing application programs, and vice versa.

As previously mentioned, all of the pointer fields 1716 contain offsets relative to the start of the property list 1518 in memory (or equivalently, to some other known position in the property list 1518). In this manner, the property pool storage manager 1328 (FIG. 13) can move the property list 1518 around in memory as desired in order to accommodate changes in the property pool 1502, without having to update pointers within the property list 1518. Similarly, all of the pointer fields in the property pool structure contain offsets relative to the start of the property pool. Thus the property pool storage manager can also move around entire pools without having to update internal pointers.

IV. PROPERTY POOL STORAGE MANAGER SPI

Figure 19:
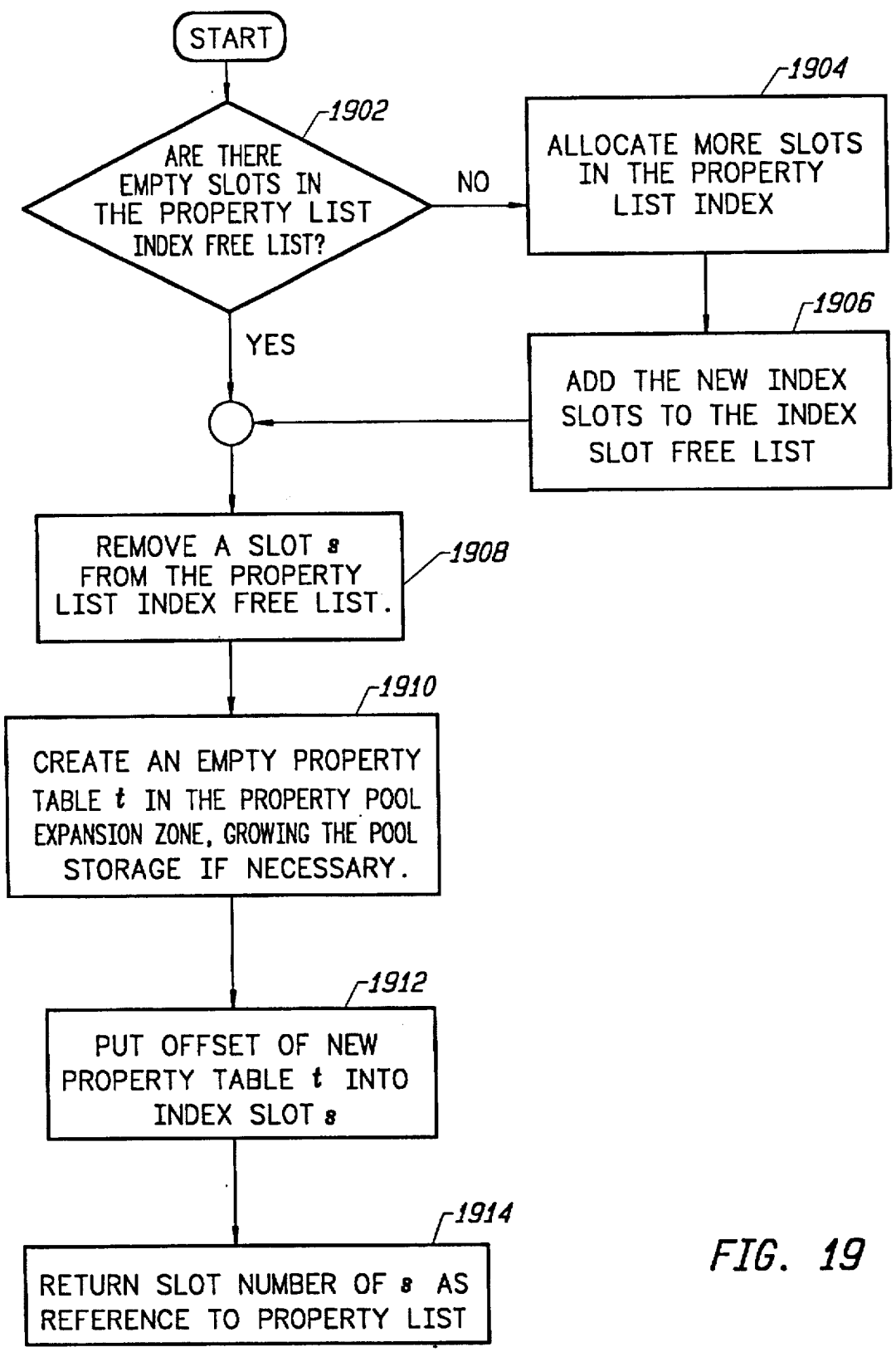
FIGS. 19-23 are flow charts of routines supported by the property pool storage manager of FIG. 13.

The SPI of the property pool storage manager 1328 will now be described with respect to a number of procedure calls which are available to user interface item managers such as 1320 and 1322 to manage property pools and property lists in property pools. FIG. 19 is a flow chart of the property pool storage manager 1328 CreatePropertyList procedure, which takes a property pool identifier as an argument and returns the property list number allocated by the property pool storage manager to the new property list. In a step 1902, the routine first determines whether the property list index 1516 of the property pool contains any free index slots. If not, then the routine allocates space in the property list index 1516 for kPropertyPoolIndexGrowthSize additional slots. In doing so, the routine may have to move some of the property lists already present in the property list region 1506 of the property pool, and to the extent it does so, it also adjusts the pointers in the property list index slots for the property lists which have been moved. The new property list index slots are added to the index slot free list in step 1906.

At this point, either because free slots were available in step 1902 or because new slots have been added in steps 1904 and 1906, the index slot free list contains at least one free slot. In step 1908, a free slot s is removed from the property list index free list. In step 1910, the routine creates a new empty property list t in the pool expansion zone 1512, growing the pool storage by a multiple of kPropertyPoolStorageGrowthSize if necessary. In step 1912, the routine places the offset of the new property list t into the property list index slot s, and in step 1914, the routine returns the slot number s as a reference to the new property list. Note that the routine of FIG. 19 might in some embodiments return a scrambled version l of the slot number s as the reference to the property list in step 1914.

Figure 20:
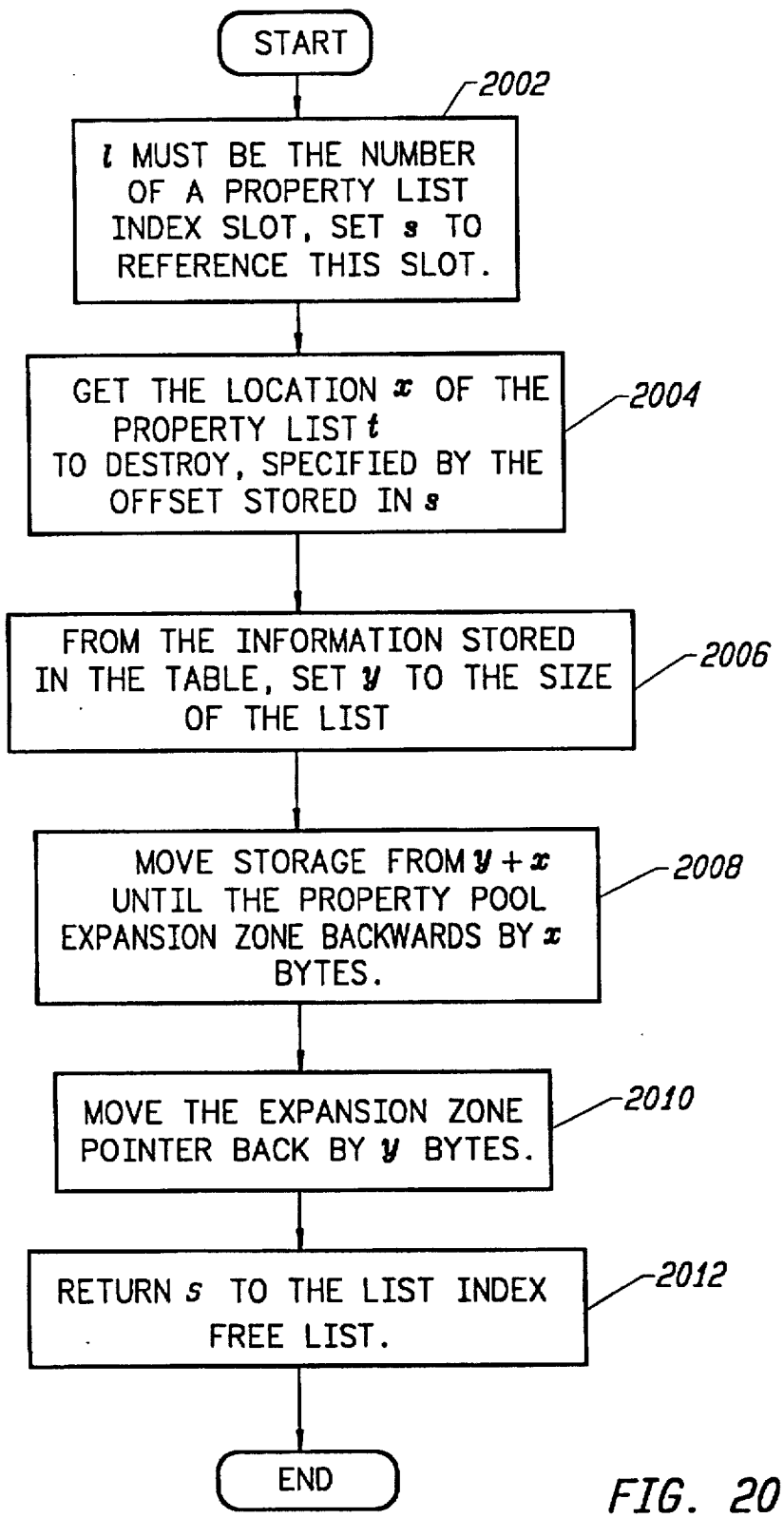

FIG. 20 is a flow chart of a DisposePropertyList procedure in the SPI of the property pool storage manager 1328, which takes a pool identifier and a list identifier l as arguments. In step 2002, the routine converts l to a property list index slot number s. In step 2004, the routine examines the property list index slot s to obtain the location x of the property list t to be destroyed. In step 2006 the routine reads the whole size y of the property list t from the whole size field 1710 of the property list. In step 2008, the routine overwrites the property list to be destroyed by moving backwards by y bytes, all the information stored from offset x+y to the property pool expansion zone 1512. In step 2010, the routine subtracts y bytes from the fPoolStorageUsedSize field of the property pool header 1514, to effectively enlarge the pool expansion zone 1512 backwards by y bytes. In step 2012 the routine returns s to the index free list in the property list index 1516.

Figure 21:
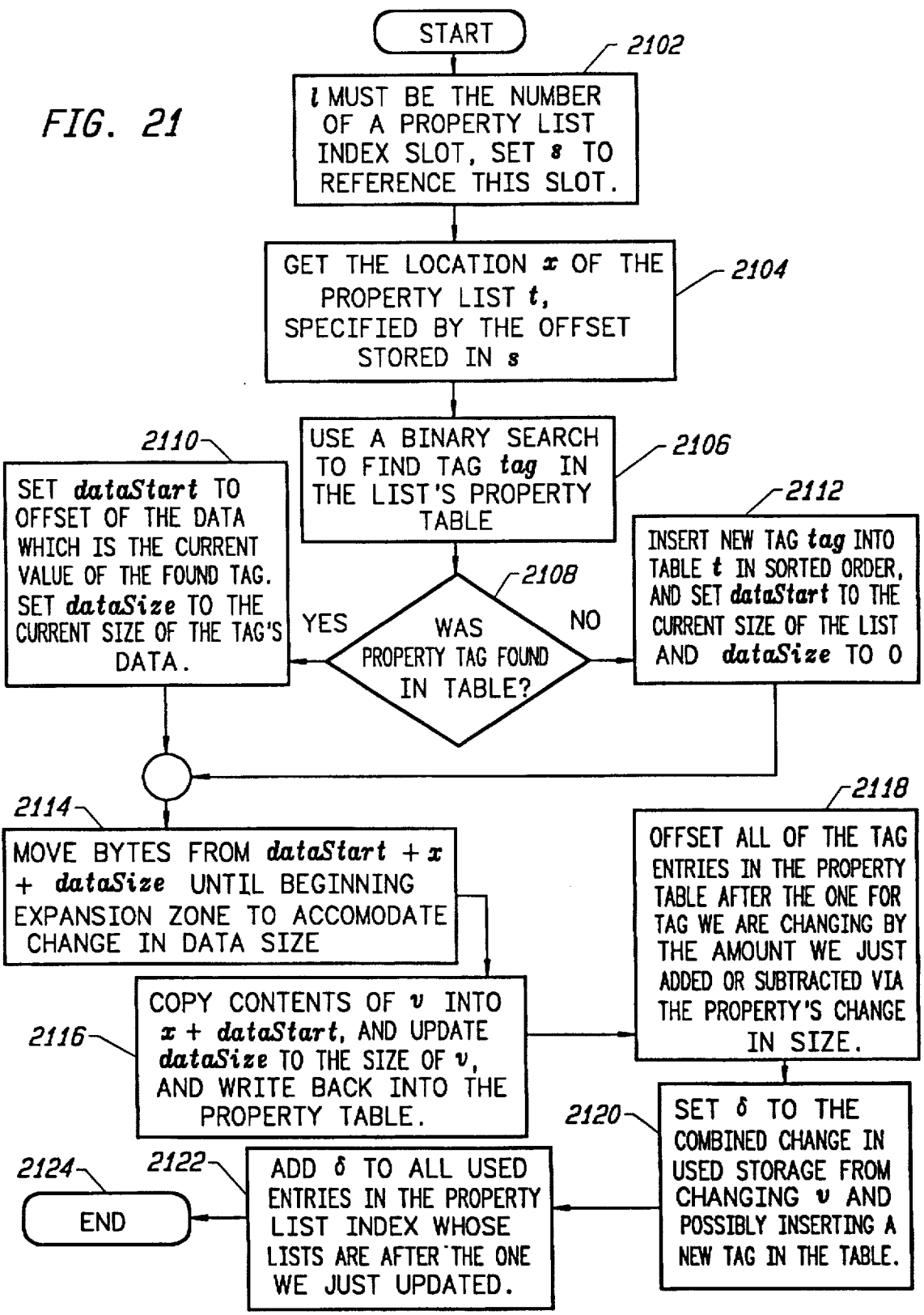

FIG. 21 is a flow chart of a property pool storage manager SPI routine SetProperty. This routine takes a pool identifier, a list identifier l, a tag and desired write data as arguments. In step 2102, the procedure converts the provided list ID l to a slot number s. In step 2104, the routine reads index slot s of the property list index 1516 for the specified pool to obtain the location x of the property list t containing the property to be updated. In step 2106, the routine uses a binary search to find the specified tag among the property tag fields 1714 in the property table region 1704 of the property list t. If the specified tag was found in the table (step 2108), then in step 2110, the routine obtains the offset of the current property data from the offset field 1716 of the property table entry in which the tag was found. Call this value dataStart. The routine also obtains the length of the current data for the property from the length of field 1718 of the property table entry in which the tag was found. Call this length dataSize. If the property tag was not found in step 2108, then in step 2112 the routine inserts a new property table entry in the property table region 1704, in sorted order according to the specified property tag, and places the tag in the tag field 1714 of the new property table entry. The routine sets the variable dataStart to the current size of the property list t (not including property expansion zone 1712), and sets the variable dataSize to zero.

After completing either step 2110 or step 2112, the routine now has in the variable dataStart, a starting address of the property data in property data region 1706 of the table t. This is the location where any old data begins and also the location where the specified new data will be written. The routine also at this time has in the variable dataSize, the size of any old data associated with the specified property tag (or zero if none). The dataStart value is relative to the beginning of the property list t, and the variable x contains the offset of the property list t from the beginning of the property pool specified by the caller.

In step 2114, the routine moves a block of data which begins at property pool location x+dataStart+dataSize and ends at the beginning of the property list expansion zone 1712, by a number of bytes given by the difference in size between the old data for the property (dataSize) and the newly specified data for the property. If the new data is shorter than the old data, then the move is toward the beginning of the property list t, and if the new data is longer than the old data (or if there was no old data), then the move is toward the end of the property pool. Moves toward the end of the property pool can utilize the property list expansion zone 1712 and any unused space 1508 or 1510 immediately following the property list t in the property pool. If this is not sufficient space for the new data, then the block of data to be moved is enlarged to extend up to the beginning of the pool expansion zone 1512, and the block is moved into the pool expansion zone 1512. If this still provides insufficient space, then the property pool itself is enlarged in the manner previously described.

In any event, after step 2114, a space has been opened for the newly specified data. In step 2116, the routine copies the specified write data into this space, which begins at pool offset x+dataStart, and writes the length of the new data into the length field 1718 for the corresponding property table entry. In a step 2118, the routine adjusts the offset fields 1716 for all of the property table entries following that containing the specified tag, by the difference in length between the old data and the newly written data. If a subsequent property list in the property pool had to be moved in step 2114, then in step 2120, the routine sets a variable δ equal to the combined change in used storage from changing the length of data as in step 2114, and from possibly inserting a new tag into the property table region 1714 in step 2112. In step 2122, the routine adds δ to all used slots in the property list index 1516 for the pool, whose corresponding property list are after the property list t in the property list region 1506. In step 2124, the routine returns to the caller.

Note that the SetProperty routine of FIG. 21 creates a property list entry if one does not already exist with the specified tag. In a different embodiment, separate routines could be provided to create a property list entry (given the property pool identifier, the property list identifier and a new tag as arguments), and to set a property value of an existing property. In such a case, the routine to create a new property entry would include steps 2102, 2104, 2106, 2108, 2112, 2120, 2122 and 2124, with the step 2108 possibly returning an error if the specified property tag was found in the existing property list. Similarly, the set property value routine would include steps 2102, 2104, 2106, 2108, 2110 and 2114 through 2124, with step 2108 possibly returning an error if the specified property tag was not found in the table.

Figure 22:
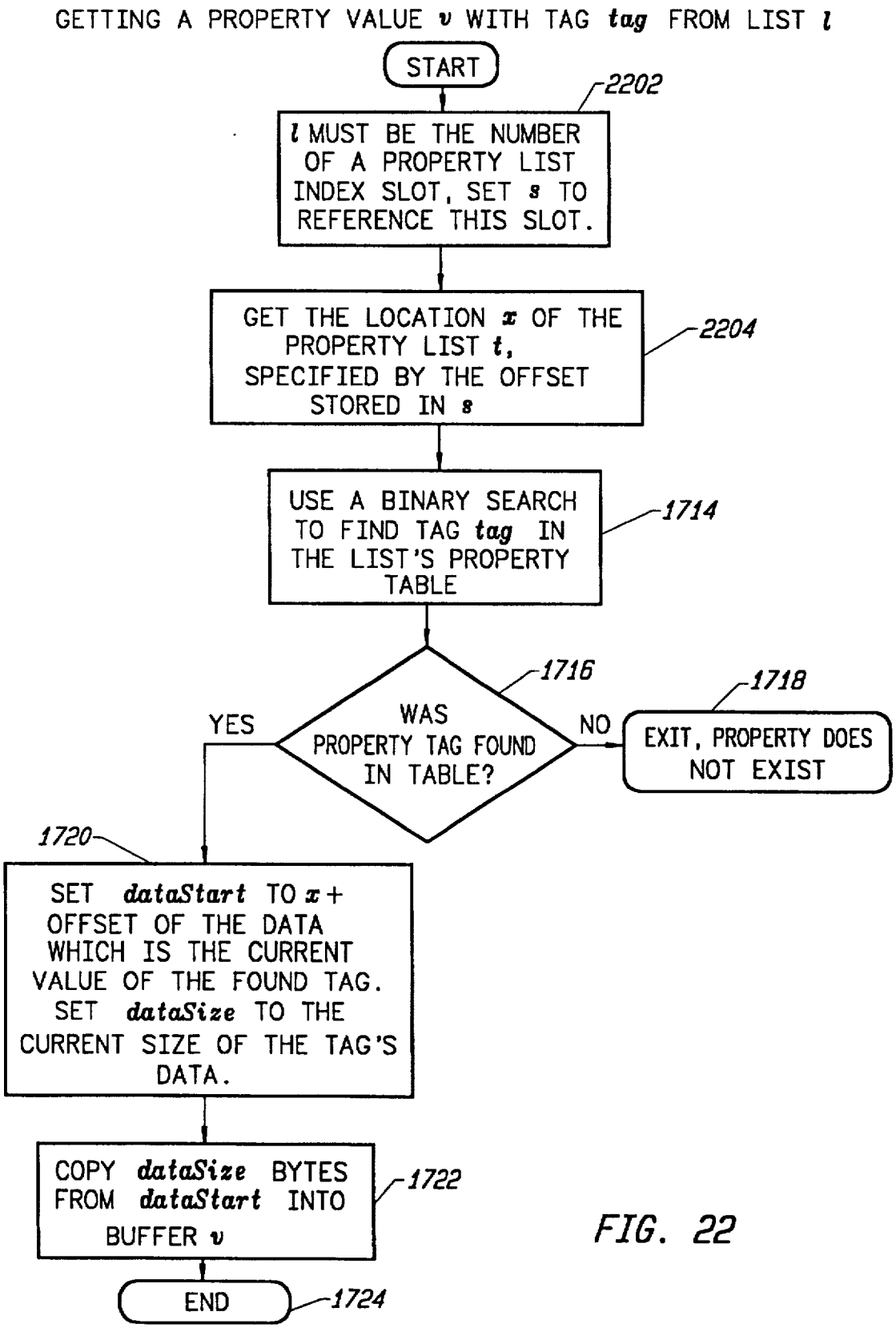

FIG. 22 is a flow chart setting forth a GetProperty procedure of the property pool storage manager 1328 SPI. This procedure takes a pool identifier, a list identifier and a tag as arguments, and returns the data for the specified pool, list and tag. In step 2202, the routine converts the provided list ID l into a property list index slot number s in the specified property pool. In step 2204, the routine examines the property list index slot s to obtain the location x of the specified property list t. In step 2206, the routine uses a binary search to find the property table entry containing the specified tag in field 1714. If the tag was not found (step 1716), then the routine exits since the property does not exist in the specified list (step 1718). If the property tag was found, then in step 1720, the routine reads from field 1716 of the property table entry in which the tag was found, the offset to the beginning of the property data. It adds the offset to x and stores the result in a variable dataStart. Step 1720 also reads the length from field 1718 of the property table entry in which the tag was found, and writes that value into a variable dataSize. In step 1722, the routine copies dataSize bytes beginning at pool offset dataStart, into the caller's buffer v. In step 1724, the routine returns to the caller.

Figure 23:
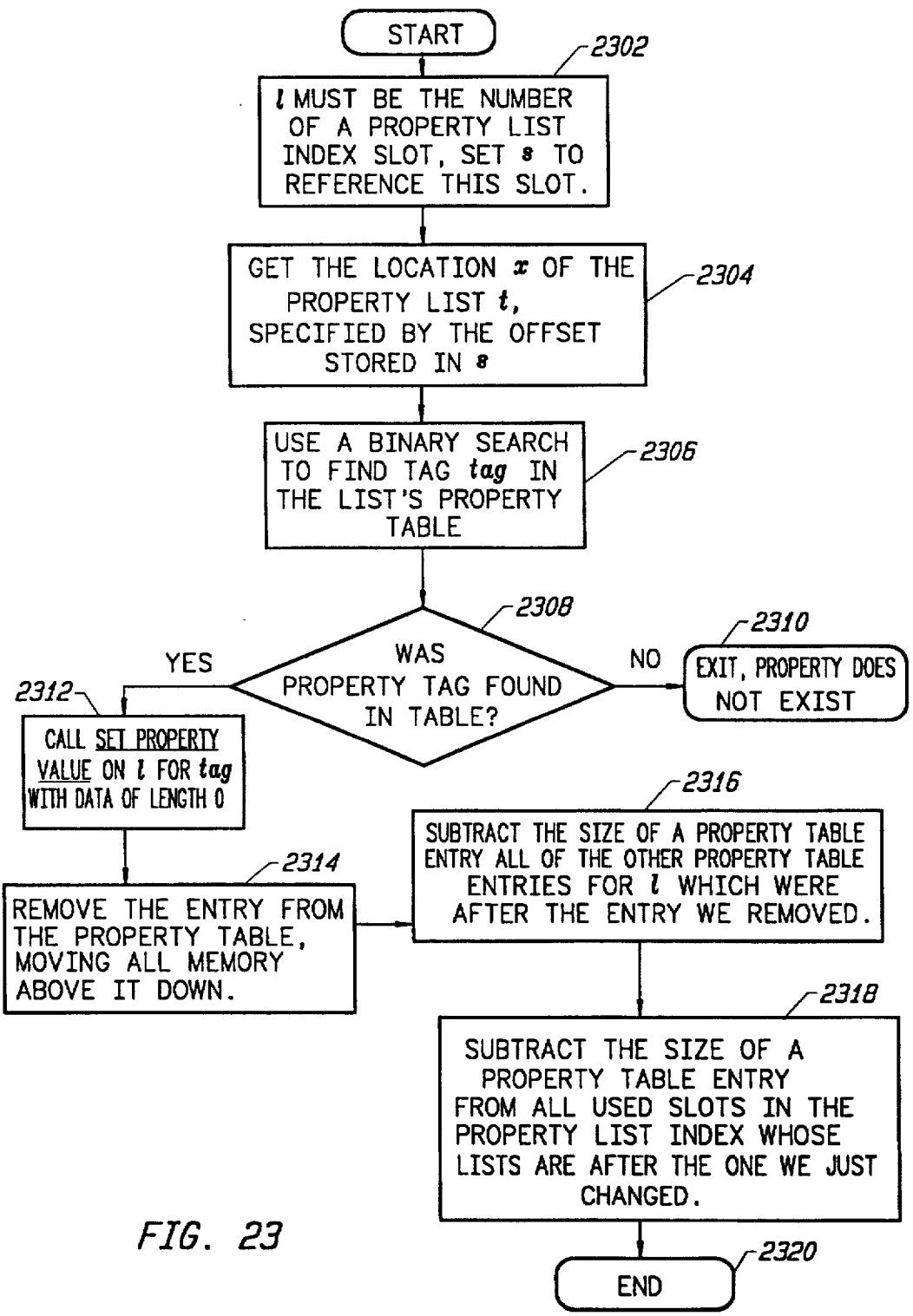

FIG. 23 is a flow chart of a RemoveProperty procedure callable in the property pool storage manager 1328 SPI, for removing a property from a property list. The procedure takes the pool identifier, list identifier l and tag as arguments. In step 2302, the routine converts l into a property list index slot number s, and in step 2304, the routine examines the slot s to obtain the offset x for the desired property list t. In step 2306, the routine uses a binary search to find the specified tag in the list's property table 1704. If the tag was not found (2308), then the desired property does not exist in the specified table and the routine exits (step 2310). If it was found, then in step 2312, the routine calls the SetProperty routine of FIG. 21, specifying the current property pool, the list ID l and the provided tag, as well as nil data. This clears the data for the property to be removed and makes corresponding offset adjustments. In step 2314, the RemoveProperty routine removes the property table entry in which the tag was found from the property table 1704, and moves all memory above it down to fill the empty space. In step 2316, the routine subtracts the size of the removed property table entry from all other property table entries in the property table 1704 which were after the entry removed in the step 2314. In step 2318, the size of the removed property table entry is subtracted from all used property index slots in the property list index 1516, whose lists are after the one modified in steps 2312 and 2314. In step 2320, the routine returns to the caller.

V. USER INTERFACE ITEM MANAGER API

Given the above, the following sample routines illustrate how a user interface item manager, accessible to an application program as well as system software, can use the property list storage manager 1328 to attach and take advantage of system-defined or application-defined properties, associated with user interface items appearing on the display. The procedures set forth below in pseudocode would be included in the API for a new menu manager 1320, and it will be understood that equivalent procedures could be provided for new control manager 1322 and for other user interface item managers not shown in FIG. 13.

Inserting a Menu Item Into a Menu
Call: InsertItem(theMenu, insertAfterItem);
Procedure:
1) Insert space in the old-style in-memory menu record for the new item.
2) In a private lookup table for theMenu, lookup property pool ID thePool for theMenu.
3) theList=CreatePropertyList(thePool)
4) Associate theList with the new item (insertAfterItem+ 1) in the private lookup table for theMenu.
Delete a Menu Item
Call: DeleteItem(theMenu, deadItem);
Procedure:
1) Lookup property pool ID thePool for theMenu.
2) Lookup property list theList for item deadItem in the private lookup table for theMenu.
3) Remove the storage for the menu item in the old-style in-memory menu record.
4) Remove the entry in the private lookup table for theMenu that associates theList with deadItem.
5) DisposePropertyList(thePool, theList);
Set a Property for a Menu Item
Call: SetMenuItemProperty(theMenu, theMenuItem, tag, data);
1) Does tag represent a piece of data in the old-style in-memory menu record? If yes, go to 6.
2) Lookup property pool ID thePool for the Menu
3) Lookup property list theList for item theMenuItem in the private lookup table for theMenu.
4) SetProperty(thePool, theList, tag, data)
5) Return with success.
6) Set appropriate field in old-style menu record indicated by tag to value of data.
Get a Property for a Menu Item
Call: GetMenuItemProperty(theMenu, theMenuItem, tag, data);
1) Does tag represent a piece of data in the old-style in-memory menu record? if it does, go to 6.
2) Lookup property pool ID thePool for the Menu
3) Lookup property list theList for item theMenuItem in the private lookup table for theMenu.
4) GetProperty(thePool, theList, tag, data)
5) Return with success.
6) Get appropriate field in old-style menu record indicated by tag and put it into data
Remove a Property for a Menu Item
Call: RemoveMenuItemProperty(theMenu, theMenuItem, tag);
1) Does tag represent a piece of data in the old-style record? If yes, return with an error because hard-coded properties cannot be removed.
2) Lookup property pool ID thePool for the Menu
3) Lookup property list theList for item theMenuItem in the private lookup table for theMenu.
4) RemoveProperty(thePool, theList, tag)
5) Return with success.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A computer system memory, for use with a display and user interface items appearing thereon, said memory having stored therein a data structure containing a list of a plurality of entries all associated with a particular one of said user interface items, each of said entries comprising a fixed length tag field in said memory and a corresponding variable length data field in said memory, said data structure comprising in a contiguous memory region:

a first contiguous memory portion including all of said tag fields; and a second contiguous memory portion distinct from said first contiguous memory portion and including all of said data fields, said first contiguous memory portion further relating each of said tag fields to a respective starting position and length of the corresponding data field in said second contiguous memory portion.

2. A memory according to claim 1, wherein said first contiguous memory portion precedes said second contiguous memory portion in said contiguous memory region, further comprising a list expansion zone following said second contiguous memory portion in said contiguous memory region.

3. A memory according to claim 2, further comprising a fixed-size list header preceding said first contiguous memory portion in said contiguous memory region, said list header indicating the number of said entries in said list and the end of said list expansion zone.

4. A memory according to claim 3, further comprising said computer system.

5. A computer system memory having stored therein an in-memory pool of lists each having a respective variable length, comprising, in a contiguous region of memory:

a fixed-size header portion;

a list index portion located in a first contiguous memory region and containing a plurality of list index entries; and a list portion located in a second contiguous memory region distinct from said first contiguous memory region and containing a respective list corresponding to each of said list index entries, each of said list index entries including a list identifier which is unique among said list index entries, and an indication of the start of the corresponding list in said list portion, said list index portion further containing a linked list of free index entries, said header region containing a head indication for said linked list.

6. A memory according to claim 5, wherein said pool further comprises a pool expansion zone in said list portion following said lists, and an indication in said header portion of the end of said pool expansion zone.

7. A memory according to claim 5, wherein each of said lists contains at least one list entry, each of said list entries comprising a fixed-length tag field and a corresponding variable length data field, each of said lists comprising:

a first portion including said tag fields; and a second portion including said data fields, said first portion further relating each of said tag fields to a respective starting position and length of the corresponding data field in said second data portion.

8. A memory according to claim 7, wherein each of said starting positions is specified in said first portion relative to a known position in said list.

9. A memory according to claim 5, further comprising a computer system including said memory and presenting a user interface on a display and user interface items appearing thereon, each of said lists being associated with a respective one of said user interface items.

* * * * *